Patented Aug. 10, 1926.

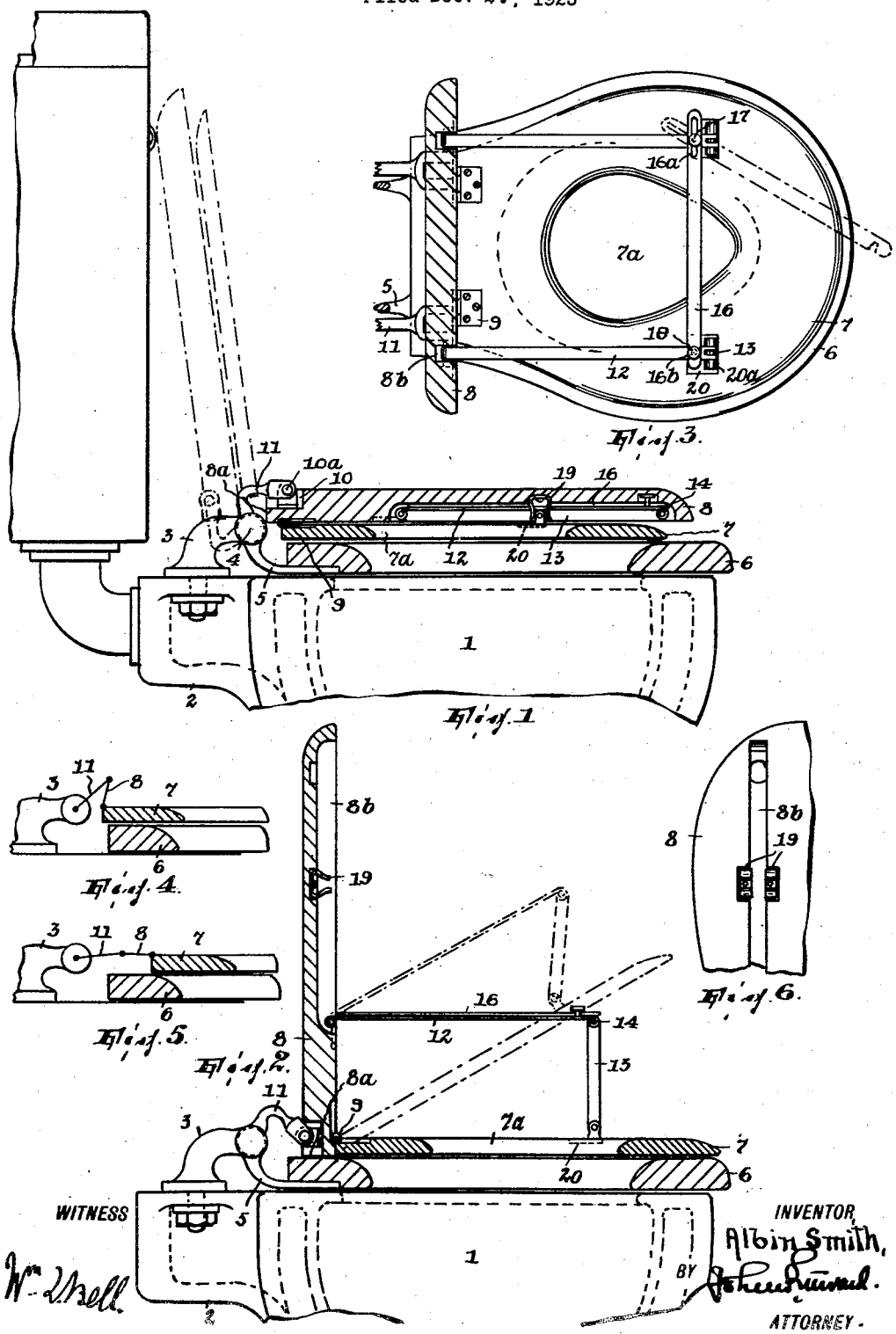

1,595,629

UNITED STATES PATENT OFFICE.

ALBIN SMITH, OF PATERSON, NEW JERSEY.

TOILET SEAT.

Application filed December 24, 1925. Serial No. 77,435.

This invention relates to toilet seating appliances for adults and small children in which there are two seats, one small and the other large. The object of the invention is to provide a seating appliance of this character which may be fitted to any existing toilet bowl, may be readily converted to use either by an adult or by a child, will include certain safety means for use when the small seat is occupied, and will on the whole be simple and inexpensive in construction.

To this end the invention includes, with a support including a large seat, a small seat arranged to overlie the first seat, and connecting members pivoted together and one pivoted to the support and the other to the second seat, the axes of all three pivots being horizontal and parallel. By this arrangement, assuming the small seat to have a cover, the small seat is capable of occupying a rearward position, or that which may be regarded as the normal one for covering the large seat symmetrically, or of being shifted forward to a position most convenient for its specific use. In fact, in the preferred construction one of said connecting members actually includes the cover. In any case the small seat (with its cover) is capable of being pivotally raised from the large seat, this being best accomplished when the small seat is arranged in its normal or rearward position.

The invention also includes, where one of said means includes the cover, means to releasably interlock the cover and small seat.

The invention further includes, with a pivotally connected seat and cover, pivotally connected folding members pivotally connecting the seat and cover at each side and serving as arms when the cover is raised and the seat is down, and in addition means to connect these arms at will to confine a child to the seat.
In the drawing, Fig. 1 is a vertical sectional front to rear view of the improved toilet seating appliance, the small seat and the cover being down;
Fig. 2 is a similar view, the small seat being down and the cover raised;

Fig. 3 is a plan, showing the small seat down and the cover, in section, elevated;

Figs. 4 and 5 are diagrams; and Fig. 6 illustrates a detail.

The bowl 1 has an extension 2 at the back to which are attached the fittings 3 affording at 4 a pivot whose axis is horizontal, and on this articulate the hinges 5 of the large seat 6; so much is the usual construction, the structure so far described affording a support for parts hereinafter described.

7 is the small seat and 8 the cover. They are hinged together at the back on a horizontal axis, as by hinges 9, in such manner that the cover may be folded in facing relation to the seat and when elevated the movement is adapted to be limited by the back edge 8ª of the cover bearing substantially squarely against the top of the large seat. How these parts are otherwise connected together I shall explain hereinafter.

The cover has at its back edge pivot members 10 whose pivot pins 10ª are alined and have their common axis parallel with that of pivot 4. These and the pivot 4 are connected by links 11.

Placed one at each side of the opening 7ª in the small seat are folding connections between this seat proper and the cover. Each of these is formed by two bars 12 13 pivotally connected together, as at 14, and a hinge element 20 (to be described) pivoted to bar 13, bar 12 being pivoted to the front or under face of the cover and the hinge element being suitably secured to the upper face of the seat, so that with the cover and seat a parallel-lever arrangement is formed. The cover is grooved from front to rear, as at 8ᵇ, to receive each pair of the bars 12 13 when the seat is down and the bars are in folded relation to each other, permitting said cover to assume its proper close face to face relation to the seat 7 at that time. The parts 12, 13 and 20 when the cover is raised and the seat down, form folding arms for the seat. In addition, the arms thus formed may be connected at the front by a bar 16 acting both as a brace and as means coacting with the arms to confine the child to the seat; this bar has a slot 16ª at one end receiving a headed stud 17 on one of the bars 12 and an inwardly open hook 16ᵇ at its other end adapted to receive a headed stud 18 on the opposite bar 12, and when not in use it may be unhooked from the latter stud and swung into coincidence with the firstnamed bar 12 and held in that position by engaging its free end in the corresponding slot 8ᵇ of the cover.

The means to releasably interlock the small seat and cover so that when the cover is raised or lowered said seat will partake of the movement is here afforded by a pair of clips 19 inset in the cover each side of each of its grooves 8ᵇ in such position that when the cover and small seat are in face to face relation these clips receive and grip the projections 20ᵃ which may be conveniently formed by the barrels of the hinge elements 20 that are used to afford the pivotal connections between bars 13 and the small seat.

The mentioned connecting members are afforded on the one hand by the links 11 and on the other by the cover (see the diagrams, Figs. 4 and 5). In Fig. 4 the connection afforded by the two members is buckled or partially folded and the small seat is consequently back or in its normal position for covering with its cover 8 the large seat symmetrically; in this position the small seat with its cover may be raised and lowered for uncovering or covering the large seat, the movement taking place about the axis at 4. In Fig. 5 the said connection is extended or straightened and the small seat is consequently conveniently forward for use; since in the example shown one of the members of the connection includes the cover the latter as an incident of the motion of said member assumes in this position of the small seat the elevated position (see Fig. 2). In this position the cover rear edge 8ᵃ is adapted to bear and therefore find support on the large seat, and it affords a back for the small seat.

Having thus fully described my invention what I claim and desire to secure by Letters Patent is:

1. In a toilet seating appliance, the combination of a support including a seat, another seat arranged to overlie the first seat, and connecting members pivoted together and one pivoted to said support and the other to the second seat, the axes of the pivots between said members and the support and second seat being horizontal and parallel.

2. In a toilet seating appliance, the combination of a support including a seat, another seat arranged to overlie the first seat, and connecting members pivoted together and one pivoted to said support and the other to the second seat, one of said members including a cover for the second seat and the axes of the pivots between said members and the support and second seat being horizontal and parallel.

3. In a toilet seating appliance, the combination of a support including a seat, another seat arranged to overlie the first seat, connecting members pivoted together and one pivoted to said support and the other to the second seat, the axes of the pivots between said members and the support and second seat being horizontal and parallel, and means to releasably interlock for pivotal movement together the second seat and the member including the cover.

4. In combination, an apertured support, a structure arranged in covering relation to the aperture of said support and pivotally connected with said support on a horizontal axis, said structure including a seat member and a cover member for the seat member pivotally connected on an axis parallel with the first axis, a foldable arm connecting the seat and cover members and means on one of said members cooperating with said arm to releasably connect them together.

In testimony whereof I affix my signature.

ALBIN SMITH.